Nov. 26, 1935.  E. J. RAY  2,021,964
STARTING AND STOPPING DEVICE
Filed Sept. 20, 1933
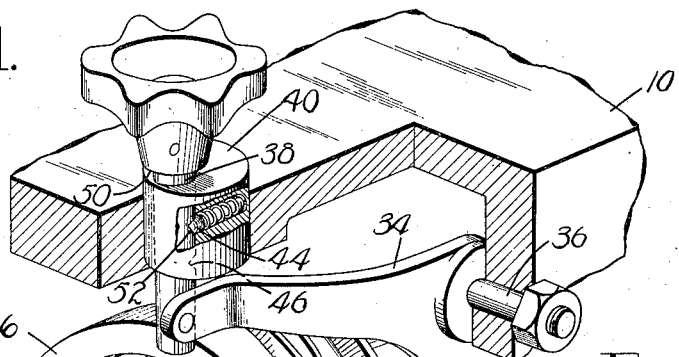
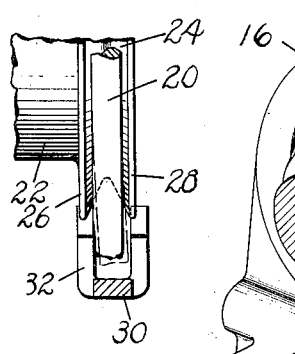
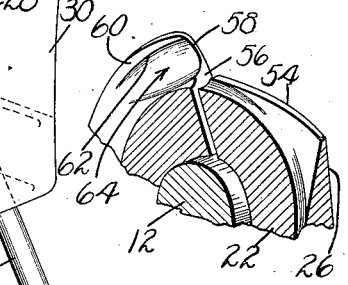
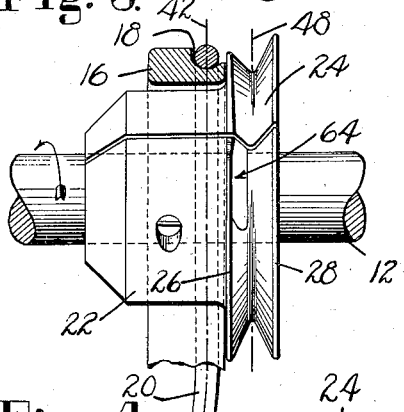
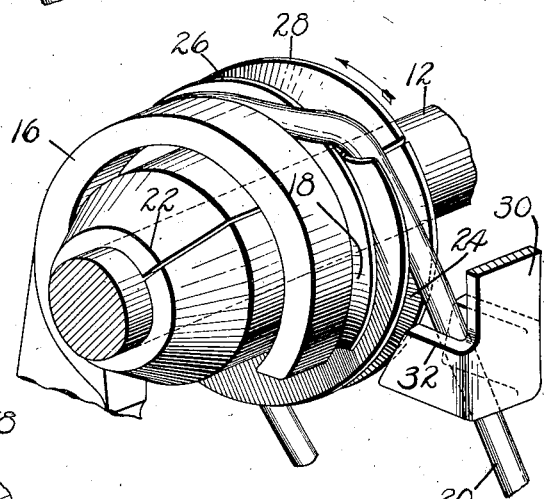
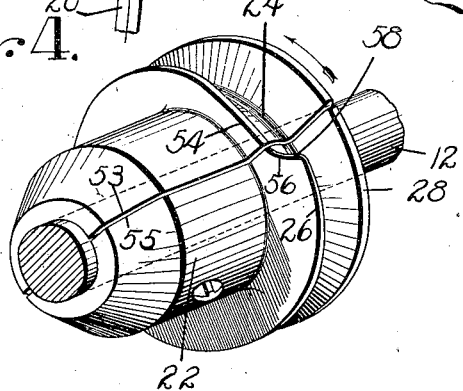
INVENTOR
Eugene J. Ray
By his Attorney
Harlow M. Davis Patented Nov. 26, 1935

2,021,964

UNITED STATES PATENT OFFICE 2,021,964

STARTING AND STOPPING DEVICE

Eugene J. Ray, Beverly, Mass., assignor to United Shoe Machinery Corporation, Paterson, N. J., a corporation of New Jersey Application September 20, 1933, Serial No. 690,221

2 Claims. (Cl. 74—242)

This invention relates to mechanism for transmitting power and is illustrated as embodied in a starting and stopping device.

It is frequently desirable to incorporate rotary grinders in machines for operating upon shoes in order conveniently to sharpen cutters which are used in such machines. The grinders, when not in use, preferably should be motionless, but provision should be made for quickly rotating the same whenever desired.

The general object of the invention is to provide an inexpensive, effective starting and stopping device which may be quickly installed in machines of various types with a minimum amount of expense.

In the illustrated construction there is provided at one side of a grooved driving pulley, around which a driving belt for a grinder or other tool runs, a belt support to which the belt may be shifted when it is desired to stop the movement of the tool, the groove in the driving pulley being formed on the side adjacent to the support by a flange having a portion of reduced radius to provide a shoulder for facilitating shifting of the belt from the pulley to the support and back again. The pulley is split and the support is mounted on a rod and extends partly around a shaft upon which the pulley is mounted. With this construction the device may be easily incorporated in various machines without changing them to any considerable extent, and the belt may readily be shifted from the pulley to the support and back again, and, while on the support, is held stationary.

This and other features of the invention, including certain details of construction and combination of parts, will be described as embodied in an illustrated machine and pointed out in the appended claims.

In the drawing,

Fig. 1 is a perspective view of the illustrated starting and stopping device, the belt being shown in operating position upon the pulley;

Fig. 2 is a perspective view of the device, portions of which have been broken away as the belt is being moved from the stationary support to the operating pulley;

Fig. 3 is a front elevation of a portion of the device, parts of the stationary belt support having been broken away in order better to show the construction of the pulley;

Fig. 4 is a perspective view showing the pulley and the shaft upon which it is mounted;

Fig. 5 is a detail view illustrating the pulley construction for assisting the shifter in moving the stationary belt on to the driving pulley; and Fig. 6 is a detail view illustrating two positions of the belt shifter with respect to the pulley during the belt shifting operation.

The illustrated starting and stopping device may be readily incorporated in the frame 10 (Fig. 1) of a machine which is provided with a continuously rotating shaft 12. The illustrated device is constructed and arranged to rotate another shaft (not shown) such, for example, as a grinder shaft carrying a rotary abrasive wheel, and to stop the same by a braking action which holds the grinder shaft stationary until it is again thrown into operation.

The illustrated starting and stopping device may be readily incorporated in various types of machines by providing a rod 14 (Fig. 1) for positioning an arcuate belt retaining member or support 16 having a groove 18 shaped and arranged to receive a driving belt 20. Secured to the shaft 12 for rotation therewith is a two-part pulley 22 (Fig. 4) positioned adjacent to the stationary support 16 and having a circumferentially disposed groove 24 which is defined by flanges 26, 28 and is constructed and arranged to receive the belt 20 and to drive the same when the belt is in operating position, as shown in Fig. 1.

In order to move the belt 20 from inoperative position upon the support 16 to operative position upon the driving pulley 22 or vice versa, the device is provided with a belt shifter 30 having a bifurcated belt-engaging portion 32 formed at the lower end of a bell crank lever 34 which is pivotally mounted upon a pin 36 supported by the frame 10 of the machine. The belt shifter may be conveniently operated by a plunger rod 38 which is pivotally secured to the lever 34 and is slidingly mounted in a bearing block 40 carried by the main frame.

When the belt 20 is positioned in the groove 18, it is desirable that the belt be tensioned (Fig. 3) to constrain the same against movement so as to exert a braking action upon the grinder shaft and accordingly the bifurcated portion 32 of the belt shifter is moved slightly to the left of a central plane 42 (Fig. 3) of the groove 18 in order to tension the belt. This is accomplished by mounting in the bearing block 40 (Fig. 1) a spring-pressed detent 44 and moving the plunger rod 38 so that such detent is in engagement with a notch 46 of the rod 38.

When shifting the belt 20 from inoperative position upon the arcuate member or support 16 to operative position upon the pulley 22, it is desirable to move the belt temporarily against the flange 28 of the pulley 22, as shown in dotted lines in Fig. 6, and then to permit the belt to move back to the central plane 48 of the groove 24. Thus, in shifting the belt 20 to the right (Fig. 1) the plunger rod 38 is pushed downwardly by the operator until a shoulder 50 on the hand-hold of the plunger rod engages the bearing block 40, the rod after being released by the operator being forced upwardly under pressure of the detent 44 until an upper notch 52 of the rod assumes a central position with respect to the detent, whereby the bifurcated portion 32 of the shifter is swung into a central plane 48 (Fig. 3) of the groove 24.

In order to expedite shifting of the belt into or out of operative position the flange 26 of the split or sectional pulley 22 is provided with a segment of reduced radius and with an adjacent shoulder. To this end one part or section 53 of the pulley has its portion of the flange 26 cut away to provide a reduced flange portion 54 (Figs. 4 and 5) and another section of the pulley has its adjacent portion of the flange 26 cut away to provide a reduced portion 56 and a shoulder 58. The reduced portion of the flange provides a passageway for the belt to be shifted progressively back and forth from the pulley to the support, and the shoulder permits the belt to be flipped into or out of the groove in the pulley.

A stationary belt is shifted with more difficulty than a moving belt to a driving pulley and with this in view the illustrated pulley 22 is constructed to tension the belt on the pulley as soon as practicable in order to start movement of the belt. This is accomplished by slightly under cutting an inside face 60 (Fig. 5) of the flange portion 26 to provide a laterally extending ridge 62 (Fig. 5) for gripping the belt 20 and forcing it into the groove 24. To insure against suddenly straining the belt 20 due to a sharp bend being formed in the belt by a thick, radially extending edge of the pulley, it has been found advantageous to bevel portions of the inside face 60 of the flange adjacent to the shoulder 58 thereby to provide a face 64 having its general surface inclined to the plane of rotation of the pulley. By straightening out the angle formed in the belt by the shoulder 58, the belt may be transferred effectively to the pulley without substantial stretching. It will be noted that by providing a shoulder 58 which extends substantially radially of the pulley, it is possible to avoid reducing the flange of the pulley along a large arc. It has been found that the device is effective if the flange is broken along an arc of approximately 45°. Since the arc of the reduced segment 54 of the flange 26 is short, the possibilities of the belt 20, especially when loose, accidentally being thrown off the pulley is reduced to a minimum. The laterally extending ridge 62 (Fig. 5) of the flange 26 also tends to prevent the belt from jumping from the pulley 22 should such belt become loose.

In the illustrated construction, the flange 26 is reduced at opposite sides of the joint between the parts 53 and 55. This construction has been found to be convenient from the manufacturing standpoint.

Having described my invention, what I claim as new and desire to secure by Letters Patent of the United States is:

1. A starting and stopping device having, in combination, a driven rotary shaft, a pulley mounted for rotation with the shaft and provided with a groove which is defined by circumferentially disposed flanges and is constructed and arranged to receive a round belt, a belt shifter having a bifurcated belt-engaging portion movable in the general direction of the axis of rotation of the shaft, a combined belt support and brake, and a detent member, said shifter being provided with a pair of notches constructed and arranged for alternative engagement with said detent member for positioning the belt either in braking engagement with said combined support and brake or in operating position in the central plane of said groove, the flange of the pulley which is positioned between the groove and the combined belt support and brake having a segment of reduced radius including a shoulder for assisting the shifter in forcing the belt on or off the pulley, and said shifter being provided with a stop to limit the movement of the bifurcated belt-engaging portion of the shifter when such portion has been moved slightly beyond the central plane of the groove, said detent being constructed and arranged for cooperation with one of the notches for positioning the central part of said bifurcated belt-engaging portion of the shifter substantially in the central plane of the groove when the operator releases the shifter.

2. In a starting and stopping device, a driven shaft, a pulley comprising one or more sections mounted for rotation with the shaft and provided with a groove constructed and arranged to receive a belt and defined by flanges which extend circumferentially of the pulley and are spaced in the direction of the axis of rotation of the shaft, a belt shifter, and a stationary support provided with an arcuate groove positioned adjacent to the pulley, said support being constructed and arranged to extend around only a portion of said shaft to facilitate mounting the same upon said shaft, a flange on one of the sections of the pulley being shaped to project beyond a corresponding flange of the adjoining section of the pulley to provide a shoulder constructed and arranged to expedite the shifting of the belt from the support to the pulley or from the pulley to the support.

EUGENE J. RAY.